United States Patent
Kaplan

(10) Patent No.: US 10,999,719 B1
(45) Date of Patent: May 4, 2021

(54) PEER-TO-PEER AUTONOMOUS VEHICLE COMMUNICATION

(71) Applicant: GM Cruise Holdings LLC, San Francisco, CA (US)

(72) Inventor: Maximilian Kaplan, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 16/701,623

(22) Filed: Dec. 3, 2019

(51) Int. Cl.
| | |
|---|---|
| H04W 4/46 | (2018.01) |
| G06F 16/29 | (2019.01) |
| H04W 4/029 | (2018.01) |
| G06F 16/23 | (2019.01) |
| H04W 84/18 | (2009.01) |

(52) U.S. Cl.
CPC .......... *H04W 4/46* (2018.02); *G06F 16/2358* (2019.01); *G06F 16/29* (2019.01); *H04W 4/029* (2018.02); *H04W 84/18* (2013.01)

(58) Field of Classification Search
CPC ....... H04W 4/46; H04W 4/029; H04W 84/18; G06F 16/2358; G06F 16/29
USPC .................................................. 455/500, 502
See application file for complete search history.

(56) References Cited

U.S. PATENT DOCUMENTS

| | | | | | |
|---|---|---|---|---|---|
| 8,352,112 | B2* | 1/2013 | Mudalige | ............... | G08G 1/164 701/24 |
| 8,521,424 | B2* | 8/2013 | Schunder | ............... | G01C 21/32 701/452 |
| 8,527,199 | B1* | 9/2013 | Burnette | ............... | G08G 1/0141 701/450 |
| 8,589,229 | B2* | 11/2013 | Laffey | ................ | G06Q 30/0261 705/14.58 |
| 8,605,947 | B2* | 12/2013 | Zhang | .................... | G08G 1/167 382/104 |
| 8,731,823 | B2* | 5/2014 | Schunder | ............... | G01C 21/32 701/451 |
| 8,996,226 | B1* | 3/2015 | Chatham | ............ | G01C 21/3602 701/25 |
| 9,014,661 | B2* | 4/2015 | deCharms | ............ | H04L 65/403 455/404.2 |
| 9,183,560 | B2* | 11/2015 | Abelow | .................. | G06Q 10/10 |
| 9,528,834 | B2* | 12/2016 | Breed | ........................ | G06T 7/73 |
| 9,547,989 | B2* | 1/2017 | Fairfield | .............. | G08G 1/0112 |
| 9,581,460 | B1* | 2/2017 | McNew | ............ | G01C 21/3697 |
| 9,703,545 | B2* | 7/2017 | Zhang | .................... | G01C 21/32 |
| 9,720,410 | B2* | 8/2017 | Fairfield | .............. | G05D 1/0027 |
| 9,791,291 | B1* | 10/2017 | Yamashita | .............. | H04L 41/22 |
| 9,820,120 | B2* | 11/2017 | deCharms | ........... | H04L 65/1059 |
| 9,820,658 | B2* | 11/2017 | Tran | ...................... | A61B 5/1112 |
| 9,836,052 | B1* | 12/2017 | Silver | ...................... | G08G 1/16 |
| 9,849,882 | B2* | 12/2017 | Byun | ...................... | H04W 4/44 |
| 9,892,296 | B2* | 2/2018 | Kovarik | ..................... | E01F 9/30 |
| 9,910,441 | B2* | 3/2018 | Levinson | ................ | G01S 17/87 |
| 9,947,224 | B2* | 4/2018 | Fairfield | ........... | G08G 1/096725 |
| 10,002,156 | B2* | 6/2018 | Lublinsky | ................ | G06F 16/29 |
| 10,005,458 | B2* | 6/2018 | Ohshima | .................. | G08G 1/04 |

(Continued)

*Primary Examiner* — Hai V Nguyen
(74) *Attorney, Agent, or Firm* — Polsinelli PC

(57) ABSTRACT

The present technology provides for establish a direct ad hoc communication link between a first vehicle and a second vehicle for exchanging the map changes. The present technology provides an efficient propagation of map changes, which can be large data files, while keeping the use of such changes under the control of a central authority.

18 Claims, 8 Drawing Sheets

(56) References Cited

U.S. PATENT DOCUMENTS

| | | | |
|---|---|---|---|
| 10,037,689 B2* | 7/2018 | Taylor | G08G 1/096844 |
| 10,078,770 B2* | 9/2018 | Kovarik | E01F 9/30 |
| 10,134,278 B1* | 11/2018 | Konrardy | G08G 1/096791 |
| 10,175,340 B1* | 1/2019 | Abari | G01S 7/006 |
| 10,218,941 B1* | 2/2019 | Park | H04N 7/183 |
| 10,242,375 B2* | 3/2019 | Bai | H04L 41/00 |
| 10,268,191 B1* | 4/2019 | Lockwood | G05D 1/0027 |
| 10,317,903 B2* | 6/2019 | Shashua | G01C 21/3407 |
| 10,317,906 B2* | 6/2019 | Ferguson | B60W 10/04 |
| 10,405,215 B2* | 9/2019 | Tavares Coutinho | H04L 67/32 |
| 10,429,194 B2* | 10/2019 | Wheeler | G05D 1/0088 |
| 10,489,972 B2* | 11/2019 | Atsmon | G05D 1/0088 |
| 10,496,766 B2* | 12/2019 | Levinson | G05D 1/0214 |
| 10,520,319 B2* | 12/2019 | Zhu | G08G 1/0129 |
| 10,527,450 B2* | 1/2020 | McNew | G01C 21/3605 |
| 10,527,706 B1* | 1/2020 | Zhang | G05D 1/0285 |
| 10,560,862 B1* | 2/2020 | Gallagher | G01C 21/3415 |
| 10,563,993 B1* | 2/2020 | Ho | G06Q 10/04 |
| 10,564,638 B1* | 2/2020 | Lockwood | G05D 1/0044 |
| 10,610,111 B1* | 4/2020 | Tran | A61B 5/4818 |
| 10,679,433 B2* | 6/2020 | Cacabelos | G07C 5/0808 |
| 10,683,016 B2* | 6/2020 | Visintainer | B60W 30/0953 |
| 10,687,024 B2* | 6/2020 | Park | H04N 1/00 |
| 10,694,485 B2* | 6/2020 | Yu | H04W 64/00 |
| 10,699,576 B1* | 6/2020 | Shih | H04W 4/40 |
| 10,726,640 B2* | 7/2020 | Raman | G06Q 40/08 |
| 10,789,848 B2* | 9/2020 | Altintas | H04W 4/46 |
| 2004/0230370 A1* | 11/2004 | Tzamaloukas | G01C 21/3492 701/400 |
| 2004/0230373 A1* | 11/2004 | Tzamaloukas | G01C 21/28 701/468 |
| 2006/0182055 A1* | 8/2006 | Coffee | H04L 67/04 370/328 |
| 2008/0004904 A1* | 1/2008 | Tran | A61B 5/4818 705/2 |
| 2008/0162027 A1* | 7/2008 | Murphy | G05D 1/0246 701/117 |
| 2008/0162036 A1* | 7/2008 | Breed | G08G 1/161 701/408 |
| 2010/0198513 A1* | 8/2010 | Zeng | G01S 17/931 701/300 |
| 2012/0038489 A1* | 2/2012 | Goldshmidt | G08G 1/166 340/903 |
| 2012/0047018 A1* | 2/2012 | Laffey | G01C 21/3682 705/14.58 |
| 2013/0242285 A1* | 9/2013 | Zeng | G01S 17/66 356/28 |
| 2013/0332069 A1* | 12/2013 | Schunder | G01C 21/32 701/430 |
| 2014/0301270 A1* | 10/2014 | Johnsson | H04W 72/0413 370/328 |
| 2014/0309833 A1* | 10/2014 | Ferguson | B60W 30/00 701/23 |
| 2014/0368601 A1* | 12/2014 | deCharms | H04W 4/029 348/14.02 |
| 2015/0127239 A1* | 5/2015 | Breed | B60W 30/00 701/70 |
| 2015/0339928 A1* | 11/2015 | Ramanujam | G06Q 50/30 701/23 |
| 2015/0346727 A1* | 12/2015 | Ramanujam | B62D 15/0285 701/23 |
| 2016/0154643 A1* | 6/2016 | Zhang | G01C 21/26 717/169 |
| 2016/0178376 A1* | 6/2016 | Moore | G08G 1/143 701/532 |
| 2016/0183282 A1* | 6/2016 | Balaban | H04W 72/1226 370/329 |
| 2016/0189544 A1* | 6/2016 | Ricci | G08G 1/0116 701/117 |
| 2016/0192166 A1* | 6/2016 | deCharms | H04L 65/1096 348/14.02 |
| 2016/0229404 A1* | 8/2016 | Byun | G05D 1/0088 |
| 2016/0231746 A1* | 8/2016 | Hazelton | G01S 13/867 |
| 2016/0295589 A1* | 10/2016 | Nikopour | H04W 4/023 |
| 2017/0046024 A1* | 2/2017 | Dascola | G06F 3/016 |
| 2017/0123429 A1* | 5/2017 | Levinson | G05D 1/0214 |
| 2017/0132334 A1* | 5/2017 | Levinson | G06F 30/20 |
| 2017/0180567 A1* | 6/2017 | Sharma | H04M 15/08 |
| 2017/0316333 A1* | 11/2017 | Levinson | G06K 9/00805 |
| 2018/0005254 A1* | 1/2018 | Bai | H04L 67/34 |
| 2018/0005407 A1* | 1/2018 | Browning | G05D 1/0251 |
| 2018/0067966 A1* | 3/2018 | Oder | G01S 13/865 |
| 2018/0092057 A1* | 3/2018 | Yamashita | H04W 4/12 |
| 2018/0098227 A1* | 4/2018 | Carnelli | H04W 64/003 |
| 2018/0151066 A1* | 5/2018 | Oba | G01C 21/3407 |
| 2018/0188037 A1* | 7/2018 | Wheeler | H04L 67/12 |
| 2018/0188044 A1* | 7/2018 | Wheeler | H04L 67/10 |
| 2018/0188045 A1* | 7/2018 | Wheeler | G06K 9/00791 |
| 2018/0189717 A1* | 7/2018 | Cao | G06Q 10/083 |
| 2018/0196439 A1* | 7/2018 | Levinson | G01C 21/34 |
| 2018/0209803 A1* | 7/2018 | Rakah | G01C 21/343 |
| 2018/0224284 A1* | 8/2018 | Danford | H04W 4/38 |
| 2018/0376357 A1* | 12/2018 | Tavares Coutinho | H04L 67/10 |
| 2019/0001993 A1* | 1/2019 | Visintainer | B60W 30/0953 |
| 2019/0019409 A1* | 1/2019 | Farr | G08G 1/0965 |
| 2019/0052722 A1* | 2/2019 | Gasking | G06Q 10/101 |
| 2019/0120640 A1* | 4/2019 | Ho | G06Q 50/30 |
| 2019/0120964 A1* | 4/2019 | Luo | G01S 17/86 |
| 2019/0137287 A1* | 5/2019 | Pazhayampallil | H04W 4/40 |
| 2019/0139403 A1* | 5/2019 | Alam | H04W 4/40 |
| 2019/0141495 A1* | 5/2019 | Jha | H04W 4/40 |
| 2019/0149365 A1* | 5/2019 | Chatterjee | H04L 5/0092 370/329 |
| 2019/0196464 A1* | 6/2019 | Lockwood | G05D 1/0016 |
| 2019/0197430 A1* | 6/2019 | Arditi | G01C 21/3438 |
| 2019/0208387 A1* | 7/2019 | Jiang | G01S 5/0205 |
| 2019/0222652 A1* | 7/2019 | Graefe | H04W 84/18 |
| 2019/0228571 A1* | 7/2019 | Atsmon | G06T 19/006 |
| 2019/0243367 A1* | 8/2019 | Huang | G05D 1/0274 |
| 2019/0244318 A1* | 8/2019 | Rajcok | G06Q 50/30 |
| 2019/0289260 A1* | 9/2019 | Park | H04L 67/10 |
| 2019/0289651 A1* | 9/2019 | Lakkaraju | H04W 76/15 |
| 2019/0304296 A1* | 10/2019 | Basu | G08G 1/096775 |
| 2019/0306676 A1* | 10/2019 | Basu | G08G 1/0133 |
| 2019/0306677 A1* | 10/2019 | Basu | H04W 4/027 |
| 2019/0339082 A1* | 11/2019 | Doig | G01C 21/32 |
| 2019/0339709 A1* | 11/2019 | Tay | G05D 1/0088 |
| 2019/0349426 A1* | 11/2019 | Smith | H04L 67/104 |
| 2019/0349794 A1* | 11/2019 | Tavares Coutinho | H04L 67/12 |
| 2019/0368882 A1* | 12/2019 | Wheeler | H04L 67/18 |
| 2019/0385450 A1* | 12/2019 | Kim | H04L 67/10 |
| 2020/0029233 A1* | 1/2020 | Gallagher | G07C 5/008 |
| 2020/0034351 A1* | 1/2020 | Matsugatani | G05D 1/0088 |
| 2020/0041296 A1* | 2/2020 | Ho | G06Q 30/0284 |
| 2020/0059886 A1* | 2/2020 | Yu | H04L 5/0048 |
| 2020/0062259 A1* | 2/2020 | Huh | B60W 30/18072 |
| 2020/0064846 A1* | 2/2020 | Chen | G01C 21/32 |
| 2020/0074024 A1* | 3/2020 | Levinson | G01S 17/931 |
| 2020/0080856 A1* | 3/2020 | Ho | G06Q 50/30 |
| 2020/0092685 A1* | 3/2020 | Fehrenbach | H04B 7/2606 |
| 2020/0098172 A1* | 3/2020 | Atsmon | G01C 11/04 |
| 2020/0103233 A1 | 4/2020 | McErlean | |
| 2020/0104965 A1* | 4/2020 | Ramot | G06Q 30/0621 |
| 2020/0125845 A1* | 4/2020 | Hess | G05D 1/024 |
| 2020/0160709 A1* | 5/2020 | Ramot | G06Q 10/109 |
| 2020/0174107 A1* | 6/2020 | Briggs | G06T 7/50 |
| 2020/0182639 A1* | 6/2020 | Ho | G06Q 10/04 |
| 2020/0182640 A1* | 6/2020 | Ho | G01C 21/3461 |
| 2020/0200547 A1* | 6/2020 | Miller | G08G 1/096805 |
| 2020/0207371 A1* | 7/2020 | Dougherty | B60W 40/02 |
| 2020/0209370 A1* | 7/2020 | Zhang | G01C 21/3848 |
| 2020/0209873 A1* | 7/2020 | Chen | G05D 1/0274 |
| 2020/0211370 A1* | 7/2020 | Chen | G06F 16/29 |
| 2020/0228950 A1* | 7/2020 | Clark | H04W 4/46 |
| 2020/0351472 A1* | 11/2020 | Park | H04W 4/50 |
| 2020/0400443 A1* | 12/2020 | Pazhayampallil | H04W 4/38 |

* cited by examiner

PEER-TO-PEER AUTONOMOUS VEHICLE COMMUNICATION

TECHNICAL FIELD

The present technology relates to peer-to-peer autonomous vehicle communication and more specifically to peer-to-peer autonomous vehicle communication of map changes.

BACKGROUND

An autonomous vehicle is a motorized vehicle that is capable of sensing its environment and navigating with little or no human input. An exemplary autonomous vehicle may include a plurality of sensor systems, such as, but not limited to, a camera sensor system, a lidar sensor system, a radar sensor system, amongst others, wherein the autonomous vehicle operates based upon sensor signal outputs by the sensor systems. Specifically, the sensor signals are provided to an internal computing system in communication with the plurality of sensor systems, wherein one or more processors execute instructions based upon the sensor signals to control a mechanical system of the autonomous vehicle, such as a vehicle propulsion system, a braking system, or a steering system.

Some autonomous vehicles use map databases to provide detailed information about lanes, legal maneuvers, locations of signs, bike lanes, and more. These map databases, and even portions thereof, can include a lot of data. Propagating updates to portions of these map databases can consume a lot of bandwidth.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
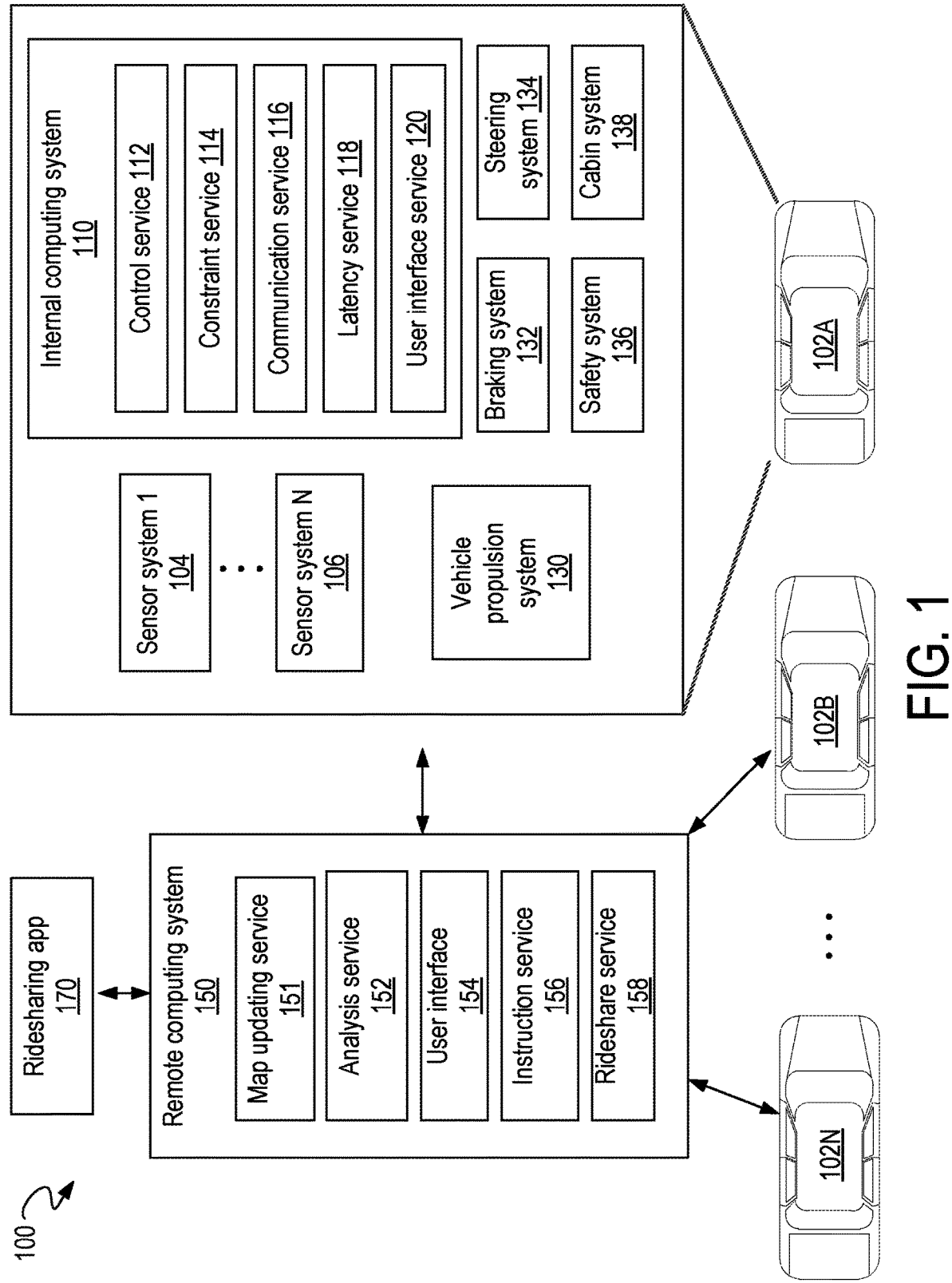
FIG. 1 shows an example of an autonomous vehicles in communication with a remote computing system in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technology addresses the need in the art for efficient peer-to-peer (P2P) communication between autonomous vehicles that are in close proximity of one another in order to communicate various changes in their respective surroundings that each of the autonomous vehicles has detected. While autonomous vehicles utilize internal map databases to aid in piloting routes in a geographic location, they also utilize sensors to determine real time conditions. Occasionally, the sensors detect inconsistencies between the current physical environment and the mapped representation of the environment. For example, the autonomous vehicles can identify a new stop sign, or a formerly bidirectional street turned one-way. The autonomous vehicles can also track transient map conditions such as traffic, construction, or event based road closures.

Once one or several vehicles identify such inconsistencies, it would be beneficial if that knowledge could be quickly confirmed and propagated throughout a fleet of autonomous vehicles. Unfortunately, propagating such changes via a Wide Area Network, such as a cellular network, can be costly and challenging. Such map updates can include a lot of data and can flood a cellular network with many incremental map updates that can degrade the performance of the cellular network that can be needed for higher priority communications. The present technology can address this problem.

Autonomous vehicles can transmit and receive these map changes via P2P communication, which can effectively propagate changes without burdening the Wide Area Network. If the autonomous vehicle identifies a map label change, which is generally identified as a high-impact change, a request may be sent to a server to be routed for review before the map label change is implemented by other autonomous vehicles in a fleet of vehicles. While the autonomous vehicle may not be able to use the new map data without authorization for the server over a Wide Area Network, such communications are generally small as compared to the map data itself which can already be stored on vehicles in the fleet of autonomous vehicles. Thus, the present technology provides for an efficient use of communication bandwidth with a central server by limiting communications to smaller and lower cost communications, and more essential communications.

FIG. 1 illustrates environment 100 that includes a fleet of vehicles 101 comprising a first autonomous vehicle 102A, a second autonomous vehicle 102B, and up to an Nth autonomous vehicle 102N (collectively, 102), all in communication with a shared remote computing system 150. Each autonomous vehicle 102 may navigate about roadways with little to no assistance from a human driver, by using sensor signals output by sensor systems 104-106 of each autonomous vehicle 102. Each autonomous vehicle 102 may include a plurality of sensor systems 104-106 (a first sensor system 104 through an Nth sensor system 106). The sensor systems 104-106 may be of different types and may be arranged about each autonomous vehicle 102. For example, the first sensor system 104 may be a camera sensor system, and the Nth sensor system 106 may be a lidar sensor system. Other exemplary sensor systems may include radar sensor systems, global positioning system (GPS) sensor systems, inertial measurement units (IMU), infrared sensor systems, laser sensor systems, sonar sensor systems, and the like.

Each autonomous vehicle 102 may further include several mechanical systems that are used to effectuate appropriate motion of each autonomous vehicle 102. For instance, the mechanical systems may include but are not limited to, a vehicle propulsion system 130, a braking system 132, and a steering system 134. The vehicle propulsion system 130 may include an electric motor, an internal combustion engine, or both. The braking system 132 may include an engine brake, brake pads, actuators, and/or any other suitable componentry that is configured to assist in decelerating the autonomous vehicle 102. The steering system 134 may include suitable componentry that is configured to control the direction of movement of each autonomous vehicle 102 during navigation.

Each autonomous vehicle 102 may further include a safety system 136 that may include various lights and signal indicators, parking brake, airbags, etc. Each autonomous vehicle 102 may further include a cabin system 138 that may include cabin temperature control systems, in-cabin entertainment systems, etc.

Each autonomous vehicle 102 may additionally comprise an internal computing system 110 that is in communication with the sensor systems 104-106 and the systems 130, 132, 134, 136, and 138. The internal computing system may include at least one processor and at least one memory having computer-executable instructions that are executed by the processor. The computer-executable instructions may make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 may include a control service 112 that is configured to control the operation of the vehicle propulsion system 130, the braking system 108, the steering system 110, the safety system 136, and the cabin system 138. The control service 112 may receive sensor signals from the sensor systems 104-106 as well communicates with other services of the internal computing system 110 to effectuate operation of the autonomous vehicle 102. In some embodiments, control service 112 may carry out operations in concert one or more other systems of autonomous vehicle 102.

The internal computing system 110 may also include a constraint service 114 to facilitate safe propulsion of the autonomous vehicle 102. The constraint service 116 may include instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service may be part of the control service 112.

The internal computing system 110 may also include a communication service 116. The communication service may include both software and hardware elements for transmitting and receiving signals from/to the remote computing system 150. The communication service 116 may be configured to transmit information wirelessly over a network, for example, through an antenna array that provides personal cellular (long-term evolution (LTE), 3G, 5G, etc.) communication and peer-to-peer communication between autonomous vehicles.

In some embodiments, one or more services of the internal computing system 110 may be configured to send and receive communications to the remote computing system 150 for such reasons as reporting data for training and evaluating machine learning algorithms, requesting assistance from the remote computing system 150 or a human operator via the remote computing system 150, software service updates, ridesharing pickup and drop off instructions etc.

The internal computing system 110 may also include a latency service 118. The latency service 118 may utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 may determine if a response was timely received from remote computing system 150 as information can quickly become too stale to be actionable. When the latency service 118 determines that a response has not been received within a threshold, the latency service 118 may enable other systems of autonomous vehicle 102 or a passenger to make necessary decisions or to provide the needed feedback.

The internal computing system 110 may also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 may be configured to send/receive communications to/from the autonomous vehicle 140 regarding reporting data for training and evaluating machine learning algorithms, updating maps at the remote computing system 150 or internal maps at the autonomous vehicles, requesting assistance from remote computing system 150 or a human operator via the remote computing system 150, software service updates, rideshare pickup and drop off instructions, etc.

The remote computing system 150 may include an analysis service 152 that is configured to receive data from autonomous vehicle 102 and analyze the data to train or evaluate machine learning algorithms for operating the autonomous vehicle 102. The analysis service 152 may also perform analysis pertaining to data associated with one or more errors or constraints reported by autonomous vehicle 102.

The remote computing system 150 may also include a user interface service 154 configured to present metrics, video, pictures, sounds reported from the autonomous vehicle 102 to an operator of remote computing system 150. User interface service 154 may further receive input instructions from an operator that can be sent to the autonomous vehicle 102.

The remote computing system 150 may also include an instruction service 156 for sending instructions regarding the operation of the autonomous vehicle 102. For example, in response to an output of the analysis service 152 or user interface service 154, instructions service 156 may prepare instructions to one or more services of the autonomous vehicle 102 or a co-pilot or passenger of the autonomous vehicle 102.

The remote computing system 150 may also include a rideshare service 158 configured to interact with ridesharing application 170 operating on (potential) passenger computing devices. The rideshare service 158 may receive requests to be picked up or dropped off from passenger ridesharing app 170 and can dispatch autonomous vehicle 102 for the trip. The rideshare service 158 may also act as an intermediary between the ridesharing app 170 and the autonomous vehicle wherein a passenger might provide instructions to the autonomous vehicle to 102 go around an obstacle, change routes, honk the horn, etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 2:
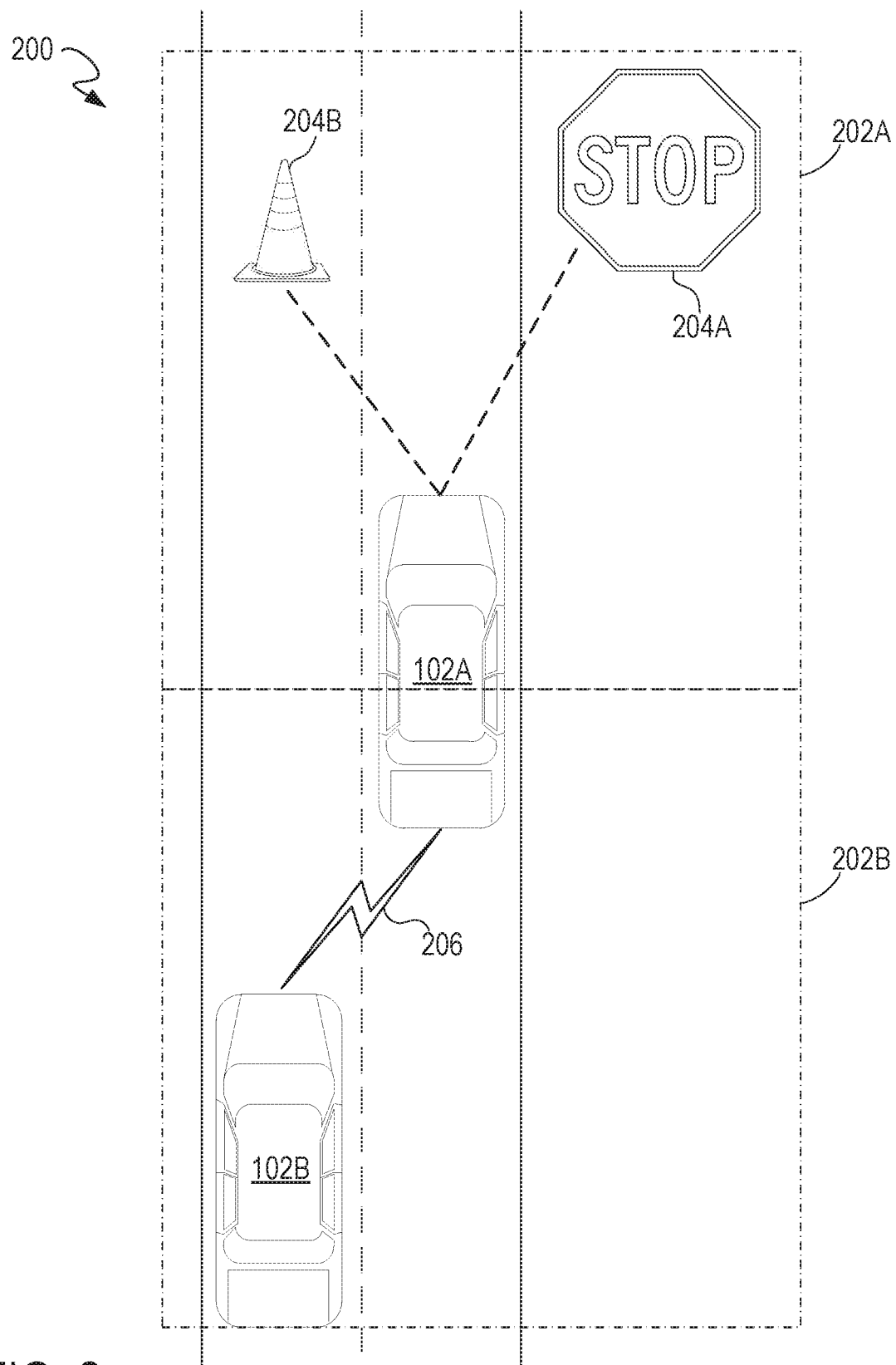
FIG. 2 shows an example environment of a first autonomous vehicle in communication with a second autonomous vehicle, in accordance with some aspects of the present technology.

FIG. 2 illustrates environment 200 where the first autonomous vehicle 102A arrives at a first tile 202A and detects various objects in its observation of the first tile 202A. A tile as illustrated in FIG. 2 is a representation of a portion of map database representing features present in a specific geographic area.

The first autonomous vehicle 102A may then determine that there is a discrepancy between one or more of the detected objects in comparison to a representation the detected object (or lack of the detected object) in the first tile 202A in a stored digital mapping of the first tile 202A.

More specifically, the first autonomous vehicle 102A may detect that a first map change 204A is a new stop sign that was not there previously. In detecting that the first map change 204A is a new stop sign, the autonomous vehicle 102A determines that the first map change 204A is a map label change. A map label change is a change in a feature of a type that is typically labeled on the map. Such labeled features contrast with map features that consistent of raw data, such as LIDAR point maps previously collected by a high definition mapping vehicle. While labeled features can show up in LIDAR point maps, the labeling provide a semantic meaning to the labeled feature. For example, a lane marking can show up in the LIDAR point map, but labels can also be added to specify the type of lane marking to provide extra meaning in the map. Likewise, a sign can be reflected in LIDAR point maps, but a label indicating a stop sign ensures that the vehicle interprets the meaning of the sign properly.

The first autonomous vehicle 102A also detects a second map change 204B, which is a new traffic cone that was not there previously. In detecting that the second map change 204B is a new traffic cone, the autonomous vehicle 102A determines that the second map change 204B is a transient map change. A transient map change is one that pertains to a short lived change in traffic patterns such as caused by construction, or traffic, etc.

As stated above, a new stop sign or a formerly bidirectional street turned one-way street are examples of map label changes and traffic, construction, and event closures are examples of transient map changes. Map label changes may be considered more permanent map changes than transient map changes that may be considered more temporary map changes. Map label changes may be considered of "higher impact" in that they have higher risk implications if diagnosed improperly. In other words, the potential impact of being "wrong" is much higher if the actual change is a street no longer being one-way as opposed to merely a change of higher congestion in traffic.

If any two detected changes conflict or are duplicative, a resolution is reached deterministically so that if the change is detected via two separate autonomous vehicles, all autonomous vehicles will be able to reach the same result state.

Referring back to FIG. 2, after the first autonomous vehicle 102A determines that the detected first map change 204A and second map change 204B are a map label change and a transient map change, respectively, a second autonomous vehicle 102B may come into close enough proximity to form a direct ad hoc communication link 206, or any other similar peer-to-peer (P2P) communication, with the first autonomous vehicle 102A.

The ad hoc communication link 206 may first be authenticated using a certificate-based authentication based on a root certificate, acting as a certificate authority, which issues certificates per autonomous vehicle and allows autonomous vehicles to securely identify and authenticate with one another. Once the ad hoc communication link 206 is established, the first autonomous vehicle 102A can send map change data regarding the detected first map change 204A and second map change 204B. When the autonomous vehicles are no longer within a P2P communication range, the autonomous vehicles may discard incompletely transferred assets, if such existed.

Figure 3A:
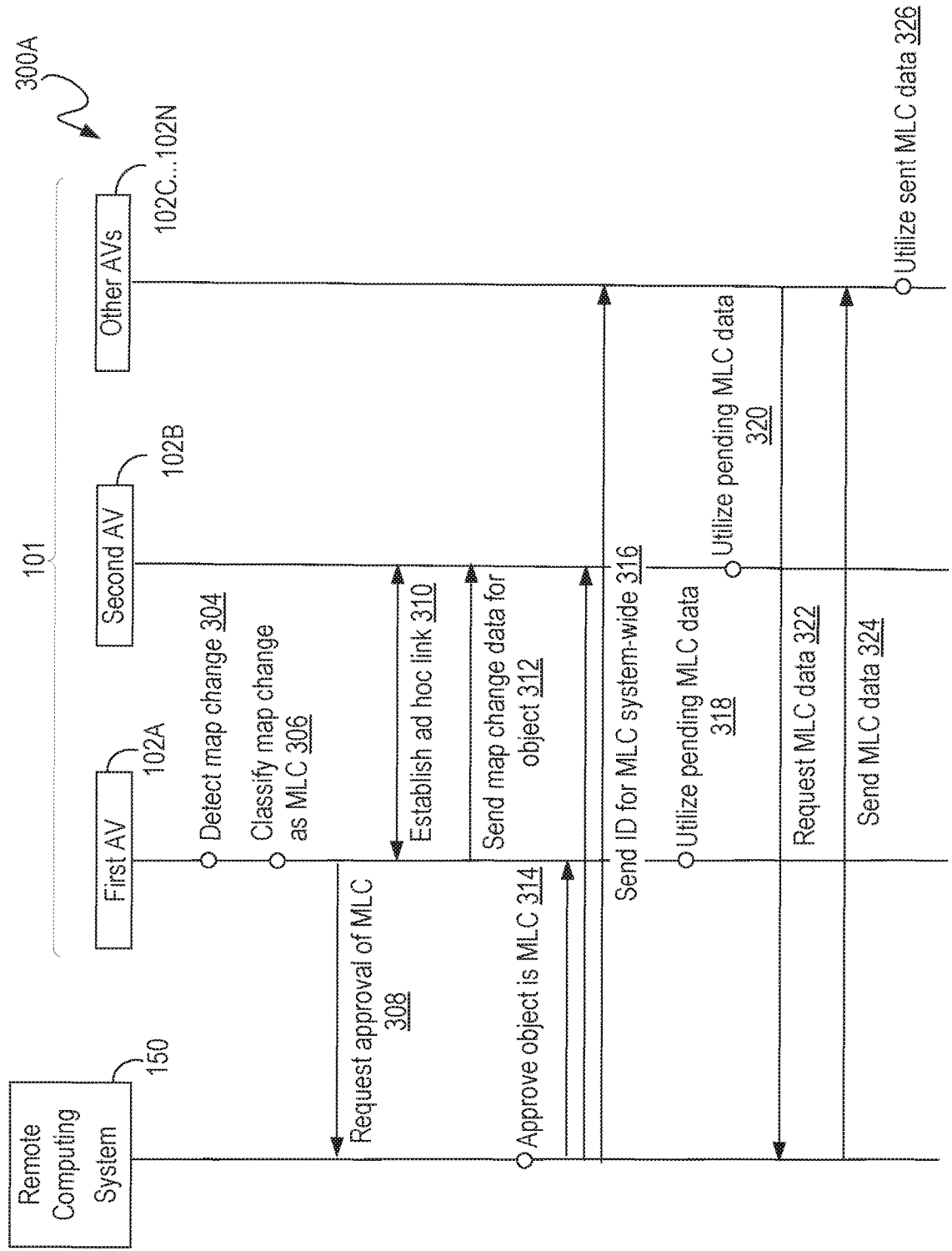
FIG. 3A and FIG. 3B show example communication flows for propagating labeled and transient map changes, respectively, by using peer-to-peer ad hoc links, in accordance with some aspects of the present technology.

FIG. 3A illustrates an example communication flow 300A for propagating map label changes within the fleet of vehicles 101 sharing the same remote computing system 150 by using peer-to-peer ad hoc links 206 to decrease the amount of data needed to transfer from the remote computing system 150 in accordance with some embodiments. The first autonomous vehicle 102A may detect (304) the first map change 204A and classify (306) the first map change 204A as map label change (MLC). Once the first autonomous vehicle 102A has completed its initial determination that the first map change 204A is a map label change, the first autonomous vehicle 102A may request (308) the remote computing system 150 for review and approval of the first map change 204A, which may include sending a screenshot/sensor view of the detected change, as confirmation that its "high-impact" determination is accurate.

Alternatively, or in addition to, the request may be sent to multiple other autonomous vehicles 102 to independently verify the change and propagate the change if a consensus is reached. The remote computing system 150 may then approve (314) that the first map change 204A should be propagated to other autonomous vehicles 102 or otherwise approved for use at the other autonomous vehicles that have the map change data pending and waiting for approval. The approval process may be conducted by one or more processors associated with the remote computing system 150 or manually performed by a user at a server-side associated with the remote computing system 150.

While the approval process is pending, the first autonomous vehicle 102A may come within a P2P communication range with the second autonomous vehicle 102B such as to establish (310) the ad hoc communication link 206. To determine what map change data to exchange with one another, the first and second autonomous vehicles 102A, 102B may send identifiers (IDs) for map change data that is likely missing from the other autonomous vehicle and begin exchanging them atomically, which may include assets which are not yet "approved" by the remote computing system 150. In exchanging assets, for traceability, the identifier may include a unique identifier for a particular detected change in question, such as a Globally Unique Identifier (GUID).

Then, each autonomous vehicle 102A, 102B may send a request to the other autonomous vehicle 102B, 102A for map change data corresponding to the IDs that each autonomous vehicle is missing. Then, the map change data that is missing is sent (312) respectively. The autonomous vehicle 102A, 102B stores the map label change as pending data, waiting for approval from the remote computing system 150.

After the remote computing system 150 approves the map label change, the remote computing system 150 may send (316) a system-wide communication to the fleet of vehicles 101, wherein the system-wide communication may comprise an ID corresponding to the approved map label change. For the first and second autonomous vehicles 102A, 102B that have map label change data as pending data, receiving the ID signals the first and second autonomous vehicles 102A, 102B to utilize the pending map label change data. For the other autonomous vehicles 102C-102N in the fleet of vehicles 101 that do not have the map label change data, the other autonomous vehicles 102C-102N may request (322) the map label change data from the remote computing system 150, which may send (324) the map label change data such that the other autonomous vehicles 102C-102N may utilize (326) the map label change data accordingly.

Figure 3B:
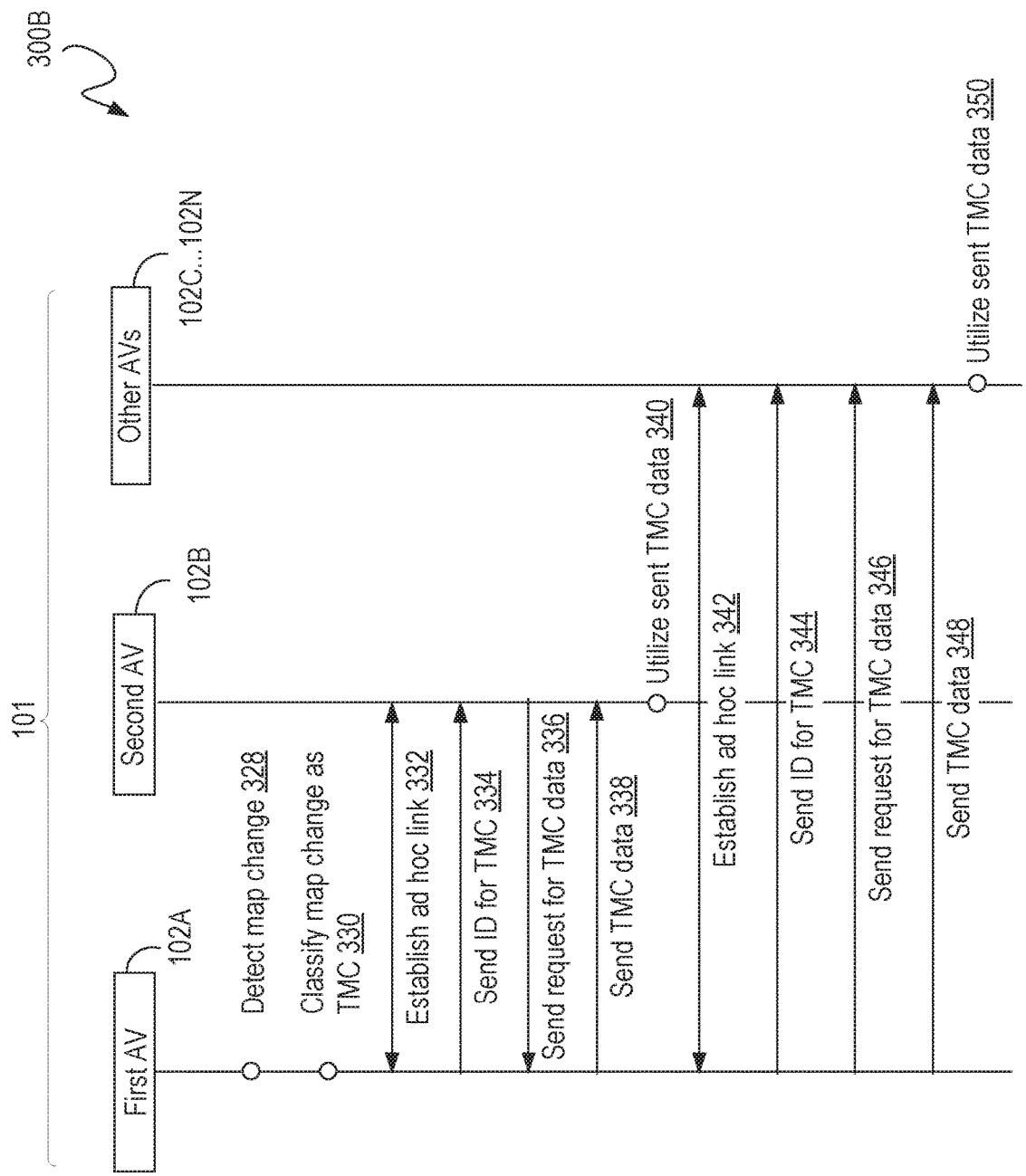

FIG. 3B illustrates an example flow 300B for propagating transient map changes using peer-to-peer ad hoc links to decrease the amount of data needed to transfer from the remote computing system 150 in accordance to some examples. The first autonomous vehicle 102A may detect (328) the second map change 204B and classify (330) the second map change 204B as transient map change (TMC). The first autonomous vehicle 102A may then come within a P2P communication range with the second autonomous vehicle 102B such as to establish (332) the ad hoc communication link 206. To determine what map change data to send, the first autonomous vehicle 102A may send (334) IDs for map change data that is likely missing from the second autonomous vehicle 102B, one of which is the ID for the second map change 204B. Then, the second autonomous vehicle 102B may send (336) a request to the first autonomous vehicle 102A for map change data corresponding to IDs that the second autonomous vehicle 102B is missing, one of which is the transient map change data corresponding to the second map change 204B. Then, the first autonomous vehicle 102A may send (338) the map change data that is missing, including the transient map change data corresponding to the second map change 204B. Then, the second autonomous vehicle 102B may be able to utilize (340) the transient map change data corresponding to the second map change 204B.

Unlike map label changes which require approval from the remote computing system 150, transient map changes may be immediately utilized by the receiving autonomous vehicle 102 receiving the transient map change data. The first autonomous vehicle 102A may establish (342) an ad hoc communication link with each of the one or more of the other autonomous vehicles 102C-Z, send (344) an ID for the transient map change through the established ad hoc communication link, receive (346) a request for transient map change data from those autonomous vehicles that are missing the transient map change data, and send (348) the transient map change data to those autonomous vehicles, such that those autonomous vehicles may utilize (350) the transient map change data.

Furthermore, for traceability, each autonomous vehicle may store a log with data including the chain of autonomous vehicles that a particular detected change has traveled through such that there is a log of historical assets, along with their origins. The log would allow a fast "roll-back" across the fleet of vehicles 101 if a systematic problem is identified with detected changes form a certain area, specific autonomous vehicle, time period, etc.

Figure 4:
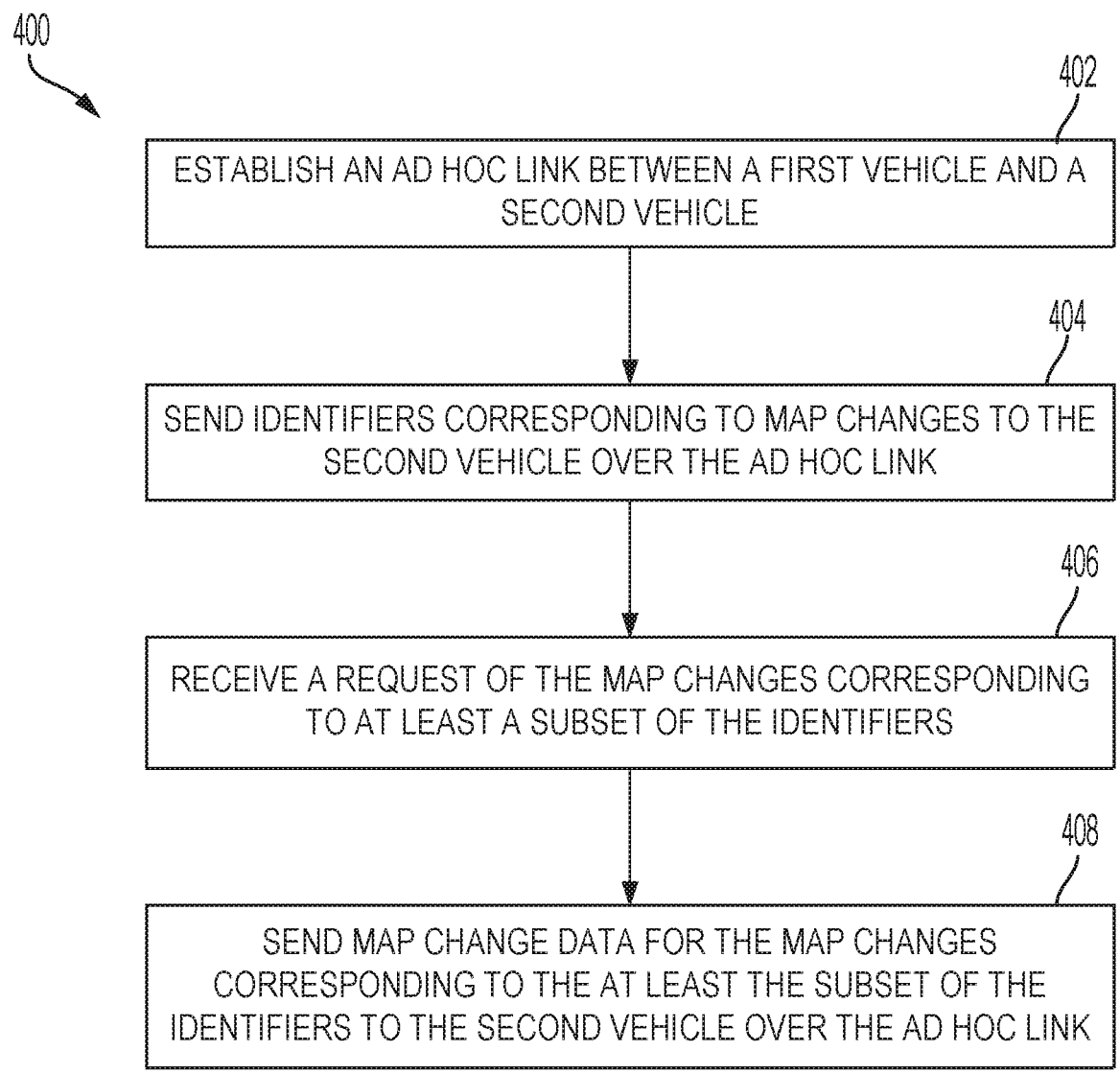
FIG. 4, FIG. 5, and FIG. 6 show example flow diagrams for facilitating peer to peer communication between autonomous vehicles, in accordance with some aspects of the present technology.

FIG. 4 is an example method 400 for sending map change data from the first autonomous vehicle 102A to the second autonomous vehicle 102B. First, the first autonomous vehicle 102A may establish (402) the direct ad hoc communication link 206 with the second autonomous vehicle 102B. Then, the first autonomous vehicle 102A may send (404) identifiers corresponding to map changes to the second autonomous vehicle 102B over the direct ad hoc communication link 206. Then, the first autonomous vehicle 102A may receive (406) a request of the map changes corresponding to at least a subset of the identifiers from the second autonomous vehicle 102B. Then, the first autonomous vehicle 102A may send (408) map change data for the map changes corresponding to the at least the subset of the identifiers to the second autonomous vehicle 102B over the direct ad hoc communication link 206.

The first autonomous vehicle 102A may first detect a discrepancy between a current observation, made by sensors of the first autonomous vehicle 102A, of an area (such as the first tile 202A in FIG. 2) and a last-saved representation of the area in a map version, wherein data corresponding to the discrepancy is the map change data. The first autonomous vehicle 102A may classify the map change data as transient map change or map label change. The first autonomous vehicle 102A may send the map change data to the remote computing system 150 if the map change data is classified as map label change. The first autonomous vehicle 102A may then receive an identifier for the map change data from the remote computing system 150, indicating that the remote computing system 150 approved the map change data to be a permanent system-wide change. Then the first autonomous vehicle 102A may utilize the map change data. In addition to the map change data, the first autonomous vehicle 102A may also send log data identifying a chain of other vehicles through which the map change data was passed.

Figure 5:
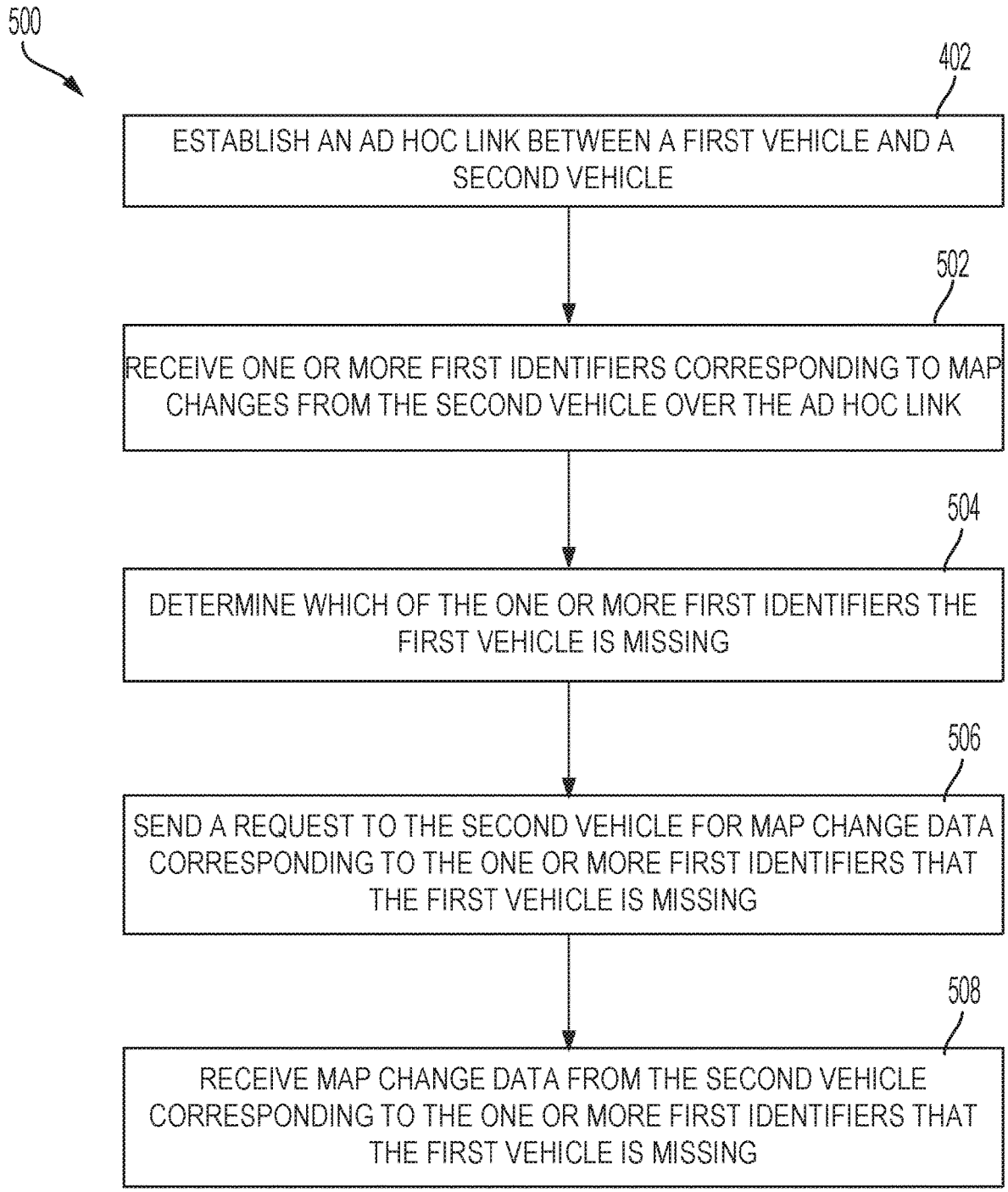

FIG. 5 is an example method 500 for receiving map change data from the second autonomous vehicle 102B by the first autonomous vehicle 102A, given that the second autonomous vehicle 102B may also have map changes to share with the first autonomous vehicle 102A. In such a case, the first autonomous vehicle 102A may receive (502) one or more first identifiers corresponding to map changes from the second autonomous vehicle 102B over the direct ad hoc communication link 206. The first autonomous vehicle 102A may determine (504) which of the one or more first identifiers the first autonomous vehicle 102A is missing. The first autonomous vehicle 102A may send (506) a request to the second autonomous vehicle 102B for map change data corresponding to the one or more first identifiers that the first autonomous vehicle 102A is missing. Then, the first autonomous vehicle 102A may then receive (508) map change data from the second autonomous vehicle 102B corresponding to the one or more first identifiers that the first autonomous vehicle 102A is missing.

For map change data classified as transient map change data, the first autonomous vehicle 102A may utilize the transient map change data. For map change data classified as map label change data, the first autonomous vehicle 102A may store the map label change data as pending data. The first autonomous vehicle 102A may receive a communication from the remote computing system 150 comprising an identifier corresponding to the map change data stored as pending data, indicating that the remote computing system 150 approved the map change data to be a permanent system-wide change. Then, the first autonomous vehicle 102A may utilize the map change data associated with the identifier at the first autonomous vehicle 102A. Alternatively, the first autonomous vehicle 102A may receive a communication from the remote computing system 150 identifying at least one identifier in the identifiers corresponding to map label change data received from the second autonomous vehicle 102B as rejected. Then, the first autonomous vehicle 102A may delete the map label change data stored as pending data associated with the at least one identifier identified as rejected.

Instead of waiting for the remote computing system 150 to authorize utility of map change data, the first autonomous vehicle 102A may also determine that a received identifier corresponds to a same map change data that is classified as map label change stored as pending data. Then the first autonomous vehicle 102A may determine that since two autonomous vehicles independently came to the same conclusion regarding the map change data, it is acceptable to utilize the map change data classified as map label change stored as pending data at the first autonomous vehicle 102A. The first autonomous vehicle 102A may also notify the second autonomous vehicle 102B that it is acceptable for the second autonomous vehicle 102B to also utilize the map change data corresponding to the received identifier.

The first autonomous vehicle 102A may receive, in addition to the map change data, log data identifying a chain of other vehicles through which the map change data has passed. The first autonomous vehicle 102A may receive a communication from the remote computing system 150 identifying one vehicle in the chain of other vehicles and consequently delete any map change data that has the identified one vehicle in the chain of other vehicles in the log data associated with the map change data.

Figure 6:
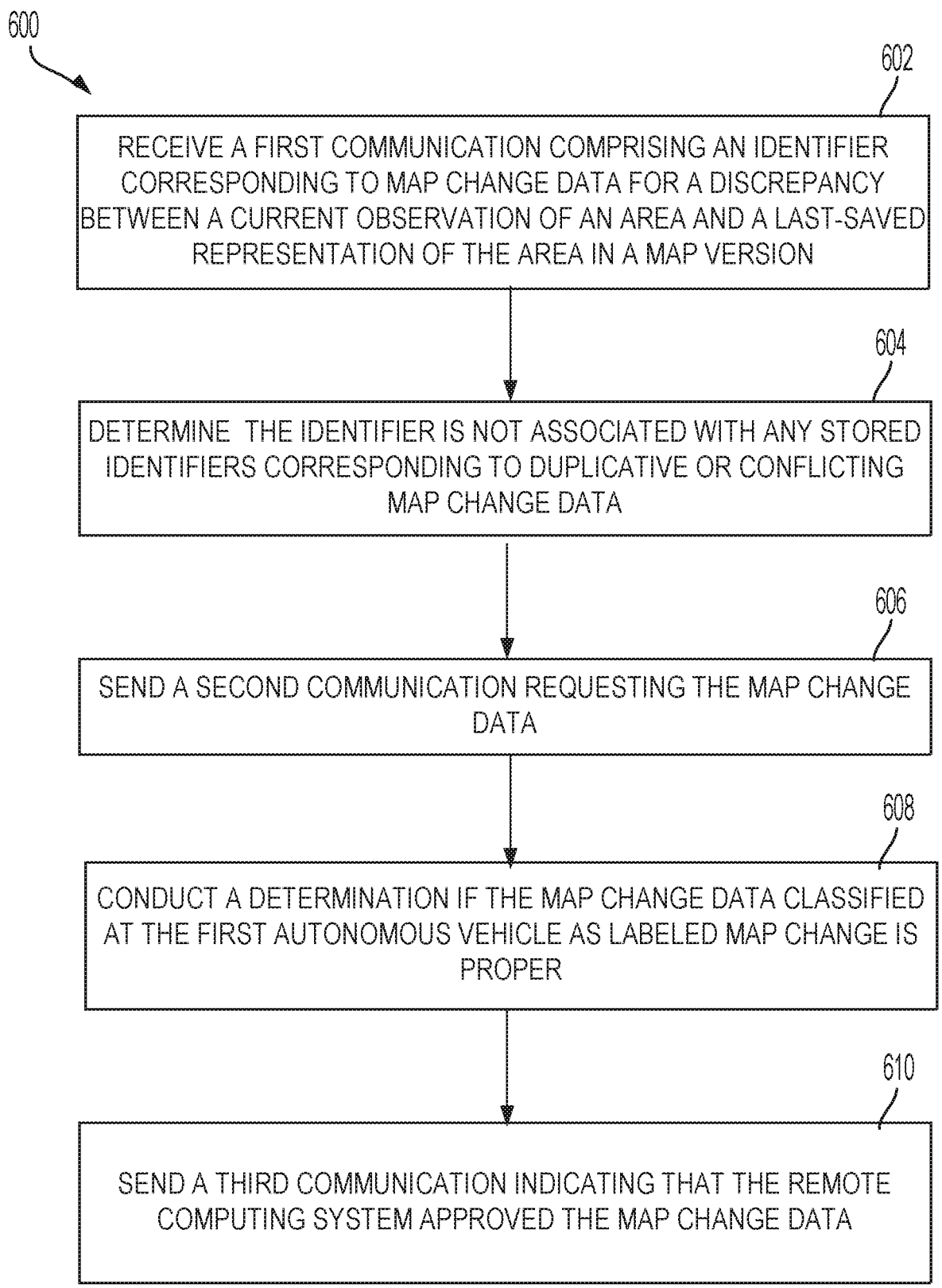

FIG. 6 is an example method 600 for determining whether a particular map change data is properly classified. The remote computing system 150 may comprise one or more processors and one or more non-transitory computer-readable media that include computer-readable instructions stored thereon that are executable by the one or more processors to perform or control performance of operations. The remote computing system 150 may receive (602) a first communication from the first autonomous vehicle 102A, the first communication comprising an identifier corresponding to map change data for a discrepancy between a current observation of an area and a last-saved representation of the area in a map version. The remote computing system 150 can determine (604) the identifier is not associated with any stored identifiers corresponding to duplicative or conflicting map change data and can send (606) a second communication requesting the map change data. The remote computing system 150 can conduct (608) a determination if the map change data classified at the first autonomous vehicle 102A as map label change is proper, and send (610) the identifier, indicating that the remote computing system 150 approved the map change data. In addition to the map change data, the remote computing system 150 can log data identifying a chain of other vehicles through which the map change data has passed may also be sent.

The remote computing system 150 can further detect that the map change data is erroneous, and send a system-wide communication to the fleet of vehicles 101, regarding the erroneous map change data, wherein the system-wide communication includes data from the log data such that vehicles through which the erroneous map change data passed are notified to delete the erroneous map change data.

The remote computing system 150 can further send a system-wide communication, which includes the third communication, comprising the identifier corresponding to the map change data to approve the map change data to be a permanent system-wide change, and receive communications from one or more vehicles in the fleet of vehicles that is missing the identifier, and send the map change data to the one or more vehicles that is missing the identifier. The remote computing system 150 can further send a system-wide communication, which includes the third communication, comprising an identifier corresponding to the map change data to notify one or more vehicles in the fleet of vehicles to utilize the map change data that is stored as pending data.

Figure 7:
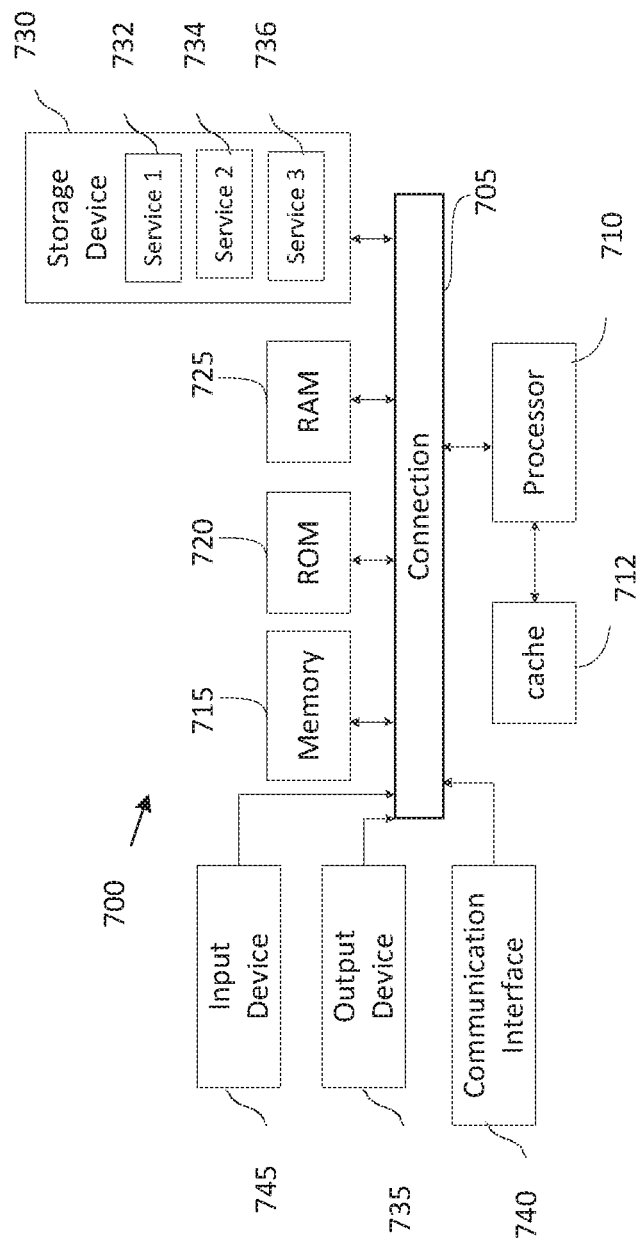
FIG. 7 shows an example of a system for implementing certain aspects of the present technology, in accordance with some aspects of the present technology.

FIG. 7 shows an example of computing system 700, which can be for example any computing device making up internal computing system 110, remote computing system 150, (potential) passenger device executing rideshare app 170, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memory (RAM), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A non-transitory computer readable medium comprising instructions stored thereon, the instructions effective to cause at least one processor of a first vehicle to:
    establish a direct ad hoc communication link between the first vehicle and a second vehicle;
    send identifiers corresponding to map changes to the second vehicle over the direct ad hoc communication link;
    receive a request of the map changes corresponding to at least a subset of the identifiers;
    send map change data for the map changes corresponding to the at least the subset of the identifiers directly to the second vehicle over the direct ad hoc communication link; and
    classify the map change data as a transient map change or a labeled map change, wherein the second vehicle is configured to immediately utilize the map change data upon receipt when the map change data is classified as a transient map change.

2. The non-transitory computer readable medium of claim 1, further comprising instructions effective to cause the at least one processor of the first vehicle to:
    detect a discrepancy between an observation of a first area made by sensors of the first vehicle and a representation of the first area in a map version, wherein data describing the observation of the first area made by the sensors of the first vehicle is the map change data.

3. The non-transitory computer readable medium of claim 2, further comprising instructions effective to cause the at least one processor of the first vehicle to:
    send the map change data to a server that is in communication with the first vehicle and the second vehicle; and
    receive the identifiers for the map change data from the server, wherein the identifiers are system wide identifiers to the map change data.

4. The non-transitory computer readable medium of claim 1, wherein, in addition to the map change data, the first vehicle sends data identifying a chain of other vehicles from which the map change data was passed.

5. The non-transitory computer readable medium of claim 1, further comprising instructions effective to cause the at least one processor of the first vehicle to:
receive identifiers corresponding to map changes from the second vehicle over the direct ad hoc communication link;
send a request for map changes corresponding to at least a subset of the identifiers received from the second vehicle; and
receive the map change data from the second vehicle for the map changes corresponding to the at least the subset of the identifiers received from the second vehicle.

6. The non-transitory computer readable medium of claim 5, further comprising instructions effective to cause the at least one processor of the first vehicle to:
for map change data classified as transient map change data, utilize the transient map change data; and
for map change data classified as labeled map change data, store the labeled map change data as inactive data.

7. The non-transitory computer readable medium of claim 5, further comprising instructions effective to cause the at least one processor of the first vehicle to:
receive a communication from a server identifying at least one identifier in the identifiers corresponding to map changes from the second vehicle as approved; and
utilize the map change data associated with the at least one identifier from the second vehicle as approved.

8. The non-transitory computer readable medium of claim 5, further comprising instructions effective to cause the at least one processor of the first vehicle to:
receive a communication from a server identifying at least one identifier in the identifiers corresponding to map changes from the second vehicle as not approved; and
delete the map change data associated with the at least one identifier from the second vehicle as not approved.

9. The non-transitory computer readable medium of claim 5, wherein, in addition to the map change data, the second vehicle sends data identifying a chain of other vehicles from which the map change data was passed, the instructions effective to cause at least one processor of the first vehicle to:
receive a communication from a server identifying one vehicle in the chain of other vehicles; and
delete any map change data that has the identified one vehicle in the chain of other vehicles.

10. A method comprising:
establishing a direct ad hoc communication link between a first vehicle and a second vehicle;
sending identifiers corresponding to map changes to the second vehicle over the direct ad hoc communication link;
receiving a request of the map changes corresponding to at least a subset of the identifiers;
sending map change data for the map changes corresponding to the at least the subset of the identifiers directly to the second vehicle over the direct ad hoc communication link; and
classifying the map change data as a transient map change or a labeled map change, wherein the second vehicle is configured to immediately utilize the map change data upon receipt when the map change data is classified as a transient map change.

11. The method of claim 10, further comprising:
detecting a discrepancy between an observation of a first area made by sensors of the first vehicle and a representation of the first area in a map version, wherein data describing the observation of the first area made by the sensors of the first vehicle is the map change data.

12. The method of claim 11, further comprising:
sending the map change data to a server that is in communication with the first vehicle and the second vehicle; and
receiving the identifiers for the map change data from the server, wherein the identifiers are system wide identifiers to the map change data.

13. The method of claim 10, wherein, in addition to the map change data, the first vehicle sends data identifying a chain of other vehicles from which the map change data was passed.

14. The method of claim 10, further comprising:
receiving identifiers corresponding to map changes from the second vehicle over the direct ad hoc communication link;
sending a request for map changes corresponding to at least a subset of the identifiers received from the second vehicle; and
receiving the map change data from the second vehicle for the map changes corresponding to the at least the subset of the identifiers received from the second vehicle.

15. A vehicle comprising:
at least one processor; and
at least one memory having computer-executable instructions stored thereon, the instructions effective to cause at least one processor of the vehicle to:
establish a direct ad hoc communication link between the vehicle and a second vehicle;
send identifiers corresponding to map changes to the second vehicle over the direct ad hoc communication link;
receive a request of the map changes corresponding to at least a subset of the identifiers;
send map change data for the map changes corresponding to the at least the subset of the identifiers to the second vehicle over the direct ad hoc communication link and
classify the map change data as a transient map change or a labeled map change, wherein the second vehicle is configured to immediately utilize the map change data upon receipt when the map change data is classified as a transient map change.

16. The vehicle of claim 15, wherein the instructions are effective to cause the at least one processor of the vehicle to:
detect a discrepancy between an observation of a first area made by sensors of the vehicle and a representation of the first area in a map version, wherein the data describing the observation of the first area made by the sensors of the vehicle is the map change data.

17. The vehicle of claim 16, wherein the instructions are effective to cause the at least one processor of the vehicle to:
send the map change data to a server that is in communication with the vehicle and the second vehicle; and
receive the identifiers for the map change data from the server, wherein the identifiers are system wide identifiers to the map change data.

18. The vehicle of claim 15, wherein the instructions are effective to cause the at least one processor of the vehicle to:
receive identifiers corresponding to map changes from the second vehicle over the direct ad hoc communication link;
send a request for map changes corresponding to at least a subset of the identifiers received from the second vehicle; and receive the map change data from the second vehicle for the map changes corresponding to the at least the subset of the identifiers received from the second vehicle.

\* \* \* \* \*